(12) United States Patent
Ito (10) Patent No.: US 10,605,346 B2
(45) Date of Patent: Mar. 31, 2020

(54) DECELERATION DEVICE

(71) Applicant: TOYOTA BOSHOKU KABUSHIKI KAISHA, Aichi (JP)

(72) Inventor: Sadao Ito, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 126 days.

(21) Appl. No.: 15/816,358

(22) Filed: Nov. 17, 2017

(65) Prior Publication Data

US 2018/0149259 A1 May 31, 2018

(30) Foreign Application Priority Data

Nov. 25, 2016 (JP) .................................. 2016-228986

(51) Int. Cl.
| | | |
|---|---|---|
| *F16H 55/08* | (2006.01) | |
| *F16H 1/32* | (2006.01) | |
| *B60N 2/22* | (2006.01) | |
| *B60N 2/225* | (2006.01) | |
| *F16H 57/08* | (2006.01) | |

(52) U.S. Cl.
CPC ....... *F16H 55/0806* (2013.01); *B60N 2/2213* (2013.01); *B60N 2/2252* (2013.01); *B60N 2/2254* (2013.01); *F16H 55/08* (2013.01); *F16H 57/08* (2013.01); *F16H 1/32* (2013.01)

(58) Field of Classification Search
CPC ........ F16H 1/32; F16H 55/08; F16H 55/0806; F16H 55/088; F16H 55/0886; F16H 2055/086; F16H 2055/0866; F16H 57/08; B60N 2/2213; B60N 2/2252; B60N 2/2254
See application file for complete search history.

(56) References Cited

U.S. PATENT DOCUMENTS

| | | | | |
|---|---|---|---|---|
| 3,247,736 | A * | 4/1966 | Roth ................... | F16H 55/0806 74/424.5 |
| 4,386,892 | A * | 6/1983 | Stich ..................... | F04C 2/084 418/170 |
| 4,969,371 | A * | 11/1990 | Allen ..................... | B23F 21/16 464/154 |
| 6,779,270 | B2 * | 8/2004 | Sonti ..................... | B21H 5/022 29/893.3 |
| 8,381,608 | B2 * | 2/2013 | Okamoto ............ | F16H 55/0806 74/460 |
| 8,490,284 | B2 * | 7/2013 | Huang ................... | F04C 2/084 29/893.35 |
| 8,777,801 | B2 * | 7/2014 | Sartori ................... | B64C 27/12 475/344 |

(Continued)

FOREIGN PATENT DOCUMENTS

| | | | | |
|---|---|---|---|---|
| DE | 102009041087 | A1 * | 3/2011 | ............... B21H 5/04 |
| JP | 4029847 | | 9/2005 | |

*Primary Examiner* — Adam D Rogers
(74) *Attorney, Agent, or Firm* — Greenblum & Bernstein, P.L.C.

(57) ABSTRACT

A deceleration device for a vehicle seat comprises an external gear comprising teeth with tops projecting radially outward. A tooth of the external gear comprises a straight portion and a critical cross-section located in a dedendum flank of the tooth of the external gear. The straight portion is provided in a vicinity of the critical cross-section and a thickness of the straight portion becomes linearly larger toward a root of the tooth.

17 Claims, 5 Drawing Sheets

(56) References Cited

U.S. PATENT DOCUMENTS

| | | | | |
|---|---|---|---|---|
| 9,039,397 B2* | 5/2015 | Fujiki | ..................... | F04C 2/084 418/166 |
| 2005/0066769 A1* | 3/2005 | Kiyosawa | ........... | F16H 55/0833 74/640 |

* cited by examiner

DECELERATION DEVICE

CROSS-REFERENCE TO RELATED APPLICATIONS

The present application claims the benefit of Japanese Patent Application No, 2016-228986 filed on Nov. 25, 2016 with the Japan Patent Office, the entire disclosure of which is incorporated herein by reference.

BACKGROUND

The present disclosure is related to a deceleration device for a vehicle seat.

In a deceleration device for a vehicle seat as disclosed in, for example, Japanese Patent No. 4029847, large loads are applied to the teeth of the external gear. The external gear mentioned here is a gear having teeth with the tops projecting radially outward.

SUMMARY

In view of the aforementioned point, it is desirable that one aspect of the present disclosure provides a deceleration device for a vehicle seat comprising an external gear that can withstand large loads.

One aspect of the present disclosure provides a deceleration device for a vehicle seat that comprises an external gear comprising teeth with tops projecting radially outward. A tooth of the external gear comprises a straight portion and a critical cross-section located in a dedendum flank of the tooth of the external gear. The straight portion is provided in a vicinity of the critical cross-section. A thickness (tooth thickness) of the straight portion becomes linearly larger toward a root of the tooth.

Accordingly, in the present disclosure, the thickness of the critical cross-section can be enlarged. As a result, the external gear can withstand large loads.

A centerline of a shape of the tooth that is an imaginary line connects a center point of a top of the tooth and a rotation center of the external gear. An angle formed by the straight portion and the centerline of the shape of the tooth may be smaller than 30 degrees.

The angle formed by the straight portion and the centerline of the shape of the tooth may be 20 degrees or larger. Specifically, the angle formed by the straight portion and the centerline of the shape of the tooth may be approximately 25 degrees.

Moreover, a first portion provided in a vicinity of the bottom land and in a dedendum flank of the tooth. The first portion may be located toward a top of the tooth relative to the circumference of the osculating circle.

Due to this configuration, the thickness the critical cross-section can be enlarged and, consequently, the external gear can withstand large loads.

The circumference of an osculating circle means the circumference of the imaginary circle that overlaps with a surface of a tooth and a surface of an adjacent tooth of the external gear and contacts a bottom land extending between the tooth and the adjacent tooth.

Furthermore, a surface of the tooth of the external gear may be a trochoidal surface.

Another aspect of the present disclosure provides a deceleration device for a vehicle seat that comprises an external gear comprising teeth with tops projecting radially outward. A tooth of the external gear comprises a linear surface in a portion of a dedendum flank of the tooth where a thickness of the portion becomes linearly larger toward a root of the tooth. The linear surface intersects with a critical cross-section of the tooth.

Still another aspect of the present disclosure provides a deceleration device for a vehicle seat that comprises an external gear comprising teeth with tops projecting radially outward. A tooth of the external gear comprises a critical cross-section included in a portion of the tooth where a thickness of the portion may become linearly larger toward a root of the tooth.

BRIEF DESCRIPTION OF THE DRAWINGS

An example embodiment of the present disclosure will be described hereinafter by way of example with reference to the accompanying drawings, in which.

DETAILED DESCRIPTION OF THE PREFERRED EMBODIMENTS

An "embodiment" to be described below shows one example of embodiments belonging to the technical scope of the present disclosure. That is, the invention-specifying matters and so on recited in the claims are not limited to specific configurations, structures, and so on illustrated in the below-described embodiment.

Arrows and the like indicating directions in the drawings are intended to facilitate understanding of mutual relationships between the drawings. The arrows and the like (directions) in the drawings do not limit the scope of the present disclosure.

A member or a portion described at least with a reference numeral assigned thereto may be two or more in number.

In the present embodiment, an explanation will be given of a recliner 10 of a vehicle seat 1. Directions in the explanation below refer to directions in a state in which the vehicle seat 1 according to the present embodiment is mounted to the vehicle.

1. Outline of Vehicle Seat

Figure 1:
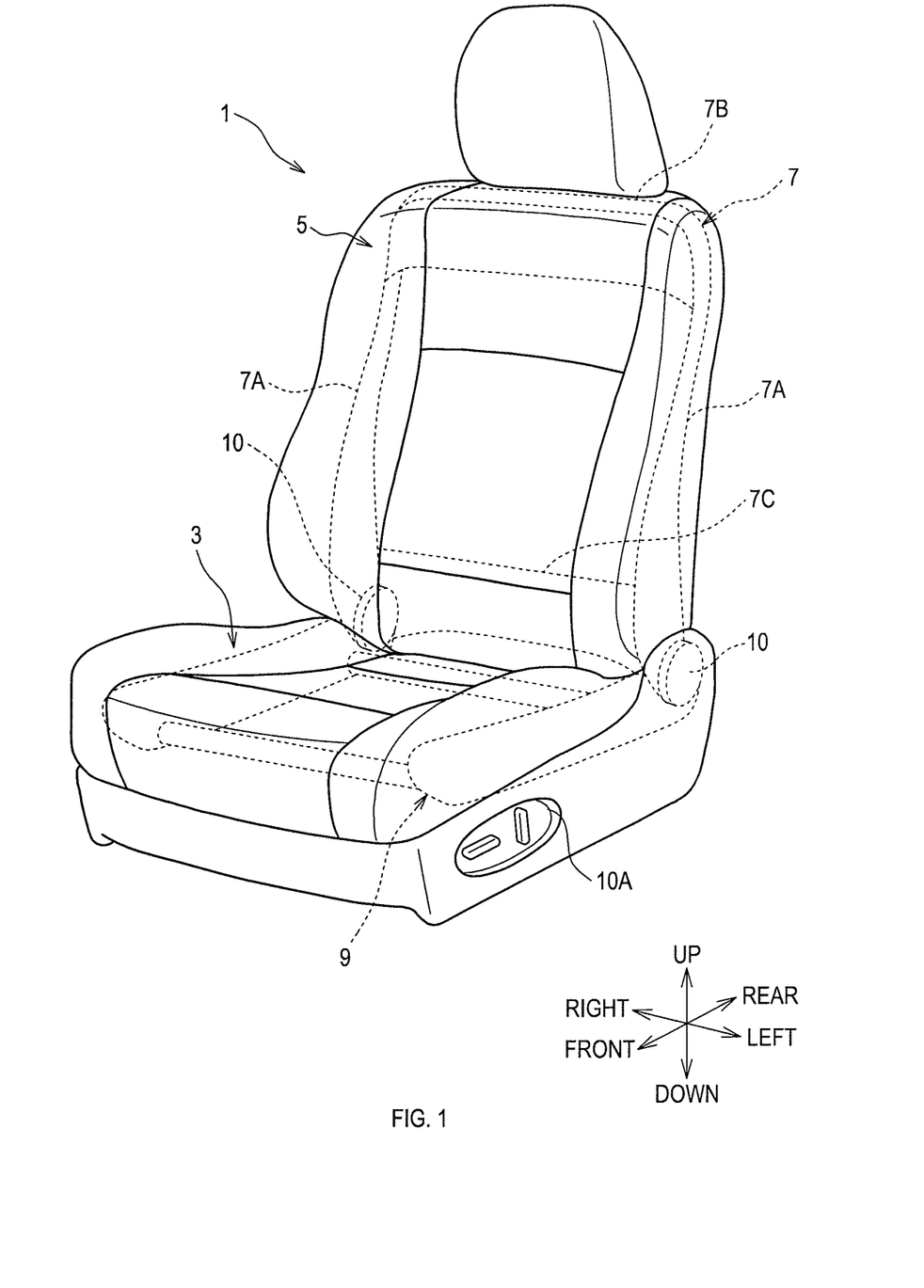
FIG. 1 is an external view showing a vehicle seat according to an embodiment the present disclosure.

As shown in FIG. 1, a vehicle seat 1 comprises at least a seat cushion 3 and a seatback 5. The seat cushion 3 is a portion to support the buttocks and so on of an occupant. The seatback 5 is a portion to support the back of the occupant, and is pivotable with respect to the seat cushion 3 in the front-rear direction of the vehicle seat 1.

A back frame 7 is a frame that forms the framework of the seatback 5, and is pivotably coupled to a cushion frame 9. The cushion frame 9 is a frame that supports the seat cushion 3.

The back frame 7 comprises two side frames 7A, an upper panel 7B, and a lower panel 7C. The side frames 7A are each a frame that extends in a substantially vertical direction and that is arranged on either side in the seat width direction. The seat width direction corresponds to the left-right direction of the vehicle in the present embodiment.

The upper panel 7B extends in the seat width direction and couples upper ends of the side frames 7A to each other. The lower panel 7C extends in the seat width direction and couples lower ends of the side frames 7A.

Both side of the seat width direction of the back frame 7, that is, the side frames 7A are each provided with a recliner 10. The recliner 10 is a mechanism that achieves a function to control reclining of the seatback 5, that is, reclining of the back frame 7 (hereinafter, to be referred to as a reclining function).

2. Recliner Structure

2.1 Recliner Structure

The two recliners 10 have the same structure except that the recliners 10 are mirror images of each other. Hereinafter, the structure of the recliner 10 will be described with reference to one of the two recliners 10 (the recliner 10 in the left side of FIG. 1) as an example. The recliners 10 are attached respectively to the lower ends of the side frames 7A. Similarly, the side frames 7A are mirror images of each other, and we will refer to the left side frame 7A below.

The reclining function according to the present embodiment is achieved by an electric angle-position adjusting mechanism. The angle-position adjusting mechanism operates in accordance with the same principle as the angle-position adjusting mechanism disclosed in, for example, Japanese Patent No. 4029847.

Figure 2:
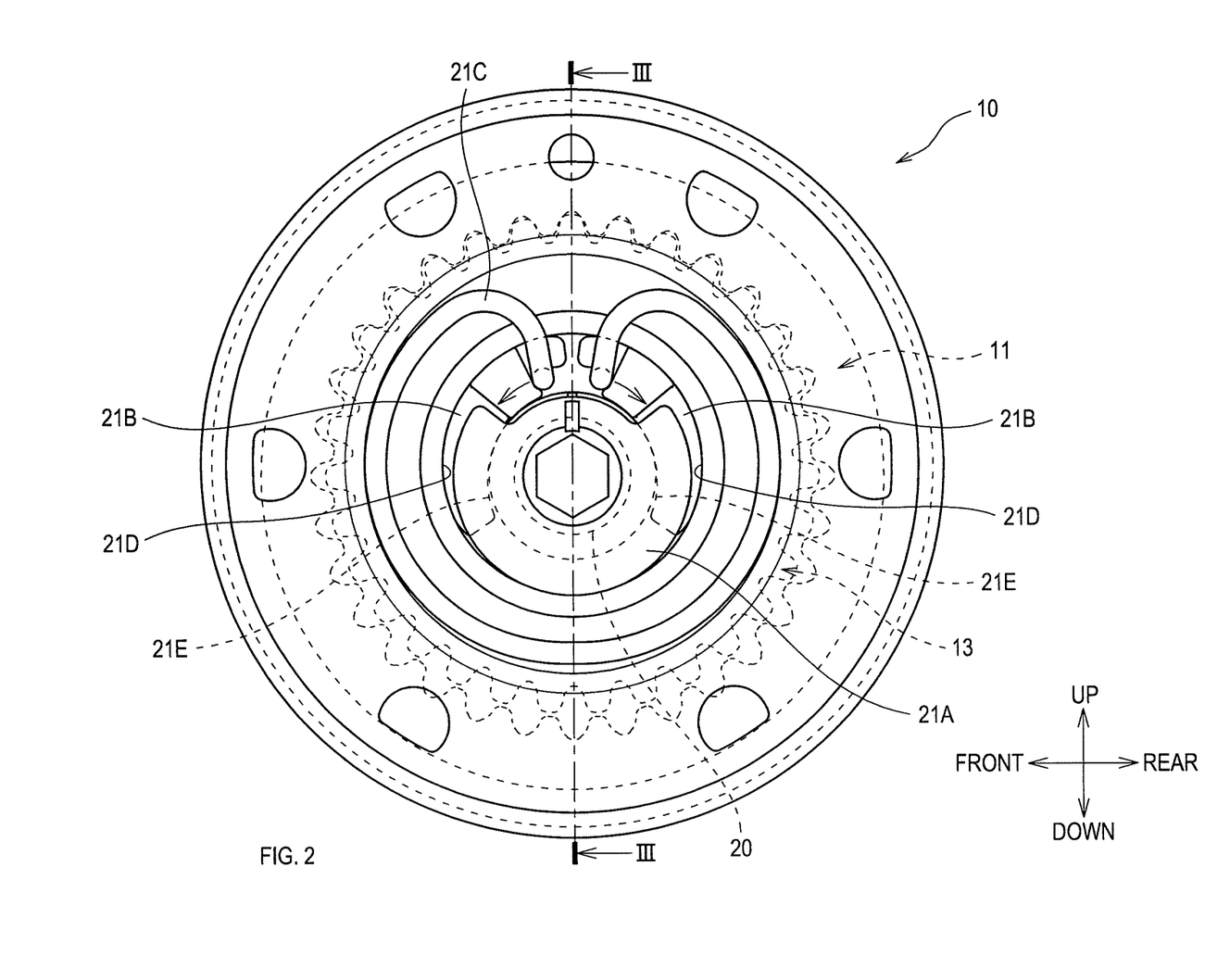
FIG. 2 is a front view showing a recliner according to the embodiment.
Figure 3:
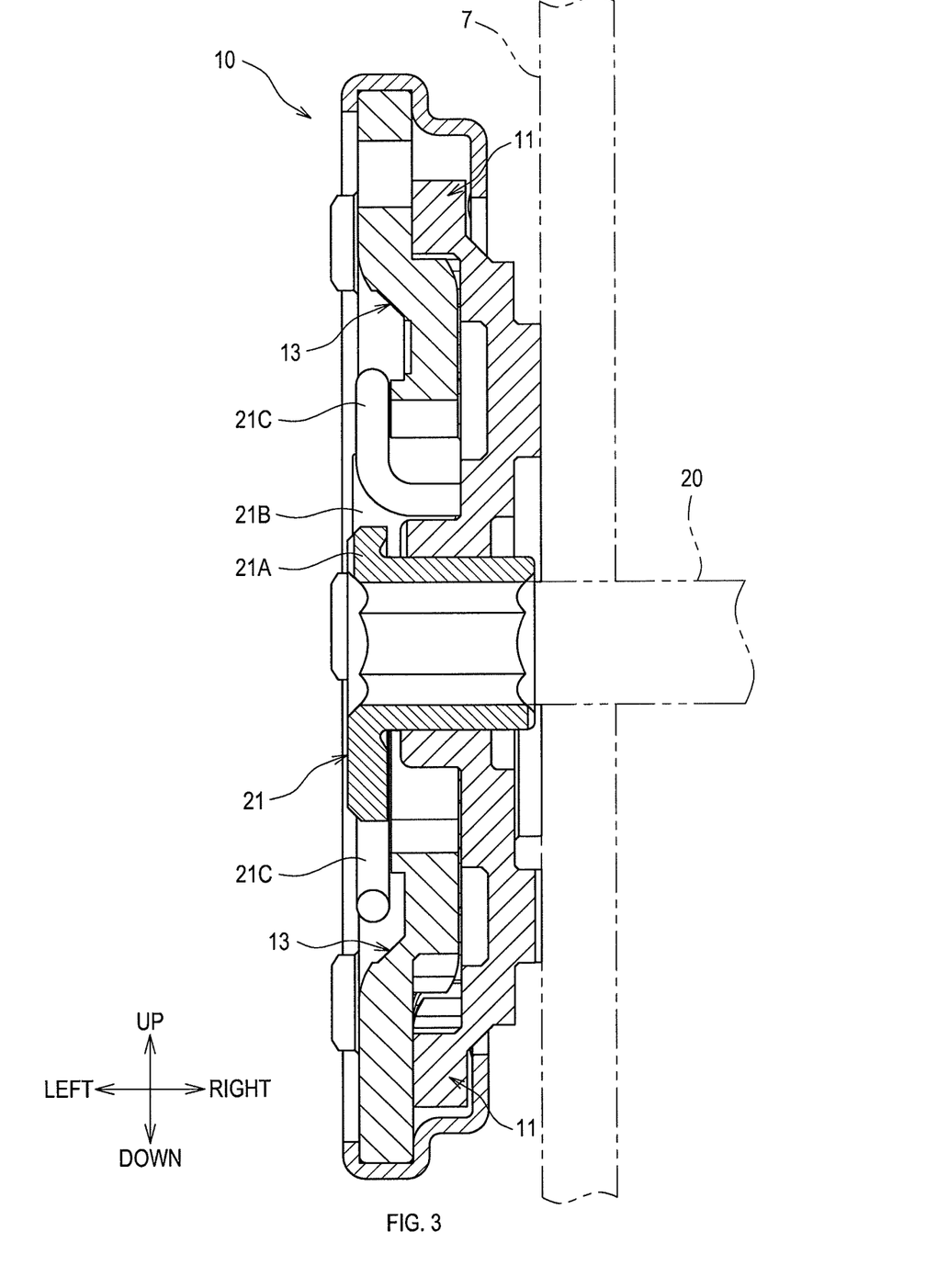
FIG. 3 is a sectional view cut along with a line III-III in FIG. 2.

The angle-position adjusting mechanism, that is, the recliner 10 comprises an internal gear 11 and an external gear 13 as shown in FIGS. 2 and 3. The internal gear 11 is a ring gear directly or indirectly secured to the side frame 7A, that is, the back frame 7. The internal gear 11 comprises teeth with tops projecting toward the center of the internal gear 11.

The external gear 13 is directly or indirectly secured to the cushion frame 9. The external gear 13 comprises teeth with the tops projecting radially outward. The external gear 13 engages with the internal gear 11 and rotates while revolving inside the internal gear 11.

Figure 4:
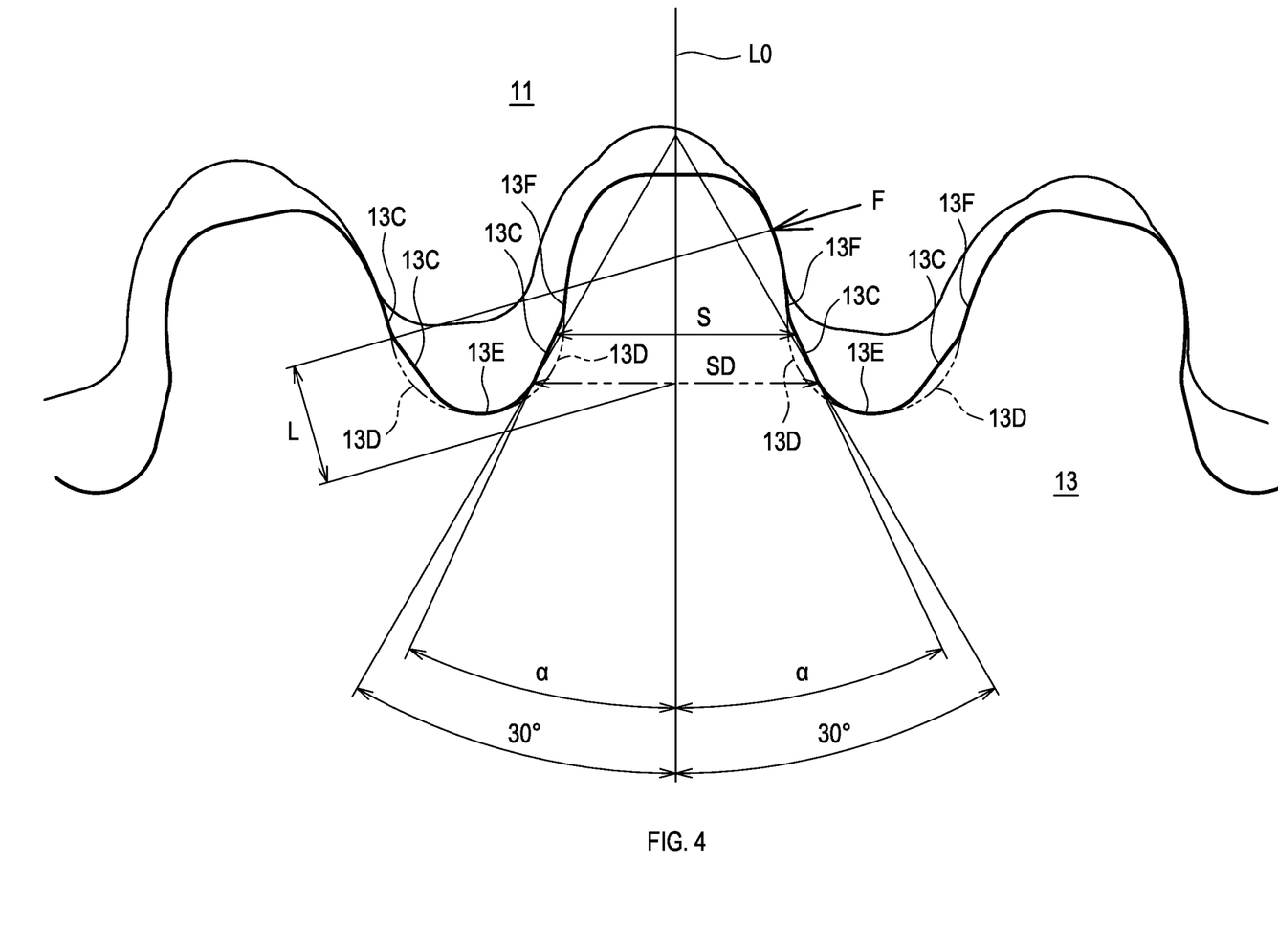
FIG. 4 is a schematic view showing an engaged state of an internal gear and an external gear according to the embodiment.

In other words, the external gear 13 is a planet gear that rotates on its center as the center of the rotation while the center of the rotation revolves around the center of the internal gear 11 as the center of revolution. As shown in FIG. 4, the surfaces of the external gear 13 and the internal gear 11 according to the present embodiment are trochoidal surfaces.

As shown in FIG. 3, the external gear 13 is supplied with rotational force from an electric motor (not shown) via a coupling rod 20. The coupling rod 20 extends between the two recliners 10 in a connecting manner so as to supply the rotational force of the electric motor to each of the recliners 10.

The electric motor (not shown) is secured to the back frame 7. Accordingly, the coupling rod 20, the electric motor, and the internal gear 11 are moved integrally with the back frame 7 relative to the cushion frame 9.

The rotational force transmitted through the coupling rod 20 is sent to the external gear 13 via a transmission mechanism 21 (including 21A-21E). The transmission mechanism 21 absorbs the equation of the center (the eccentricity) between the external gear 13 and the internal gear 11 and transmits the rotational force to the external gear 13.

Specifically, as shown in FIGS. 2 and 3, the transmission mechanism 21 comprises an engagement portion 21A, two wedge portions 21B, and a spring 21C. The engagement portion 21A engages with the coupling rod 20 in a meshed manner.

The two wedge portions 21B are wedged members each comprising an outer circumferential surface 21D with a circular circumference shape contacting the inner peripheral surface of the external gear 13, and an inner circumferential surface 21E with an circular circumference shape contacting the outer circumferential surface of the engagement portion 21A. The distance between the outer circumferential surface 21D and the inner circumferential surface 21E decreases toward one side of the wedge portion 21B in the circumferential direction.

The spring 21C elastically presses the wedge portions 21B in the directions of the two wedges (in the direction indicated with the arrows in FIG. 2). The directions of the wedges are led from a portion with a large distance between the outer circumferential surface 21D and the inner circumferential surface 21E toward a portion with a small distance between the outer circumferential surface 21D and the inner peripheral surface 21E.

2.2 Movement of Recliner

When the external gear 13 is rotated by n degree(s), the external gear 13 is revolved by $(Z2-Z1)/Z2 \times n$ degree(s) wherein the number of teeth of the external gear 13 is represented by $Z1$ and the number of teeth of the internal gear 11 is represented by $Z2$ ($>Z1$).

Accordingly, for every one rotation of the external gear 13, the center of the rotation of the external gear 13 is shifted relative to the internal gear 11 in the direction of the revolution. Specifically, for every one rotation of the external gear 13, the center of the rotation of the external gear 13 is shifted by $360-[(Z2-Z1)/Z2 \times 360]$ degree(s) in the direction of the revolution.

Thus, when the electric motor is rotated via the coupling rod 20, the external gear 13 is shifted in the direction of the revolution. As a result, the back frame 7 is reclined relative to the cushion frame 9 in a direction opposite to the direction of the revolution.

2.3 Shape of Teeth of External Gear

Figure 5:
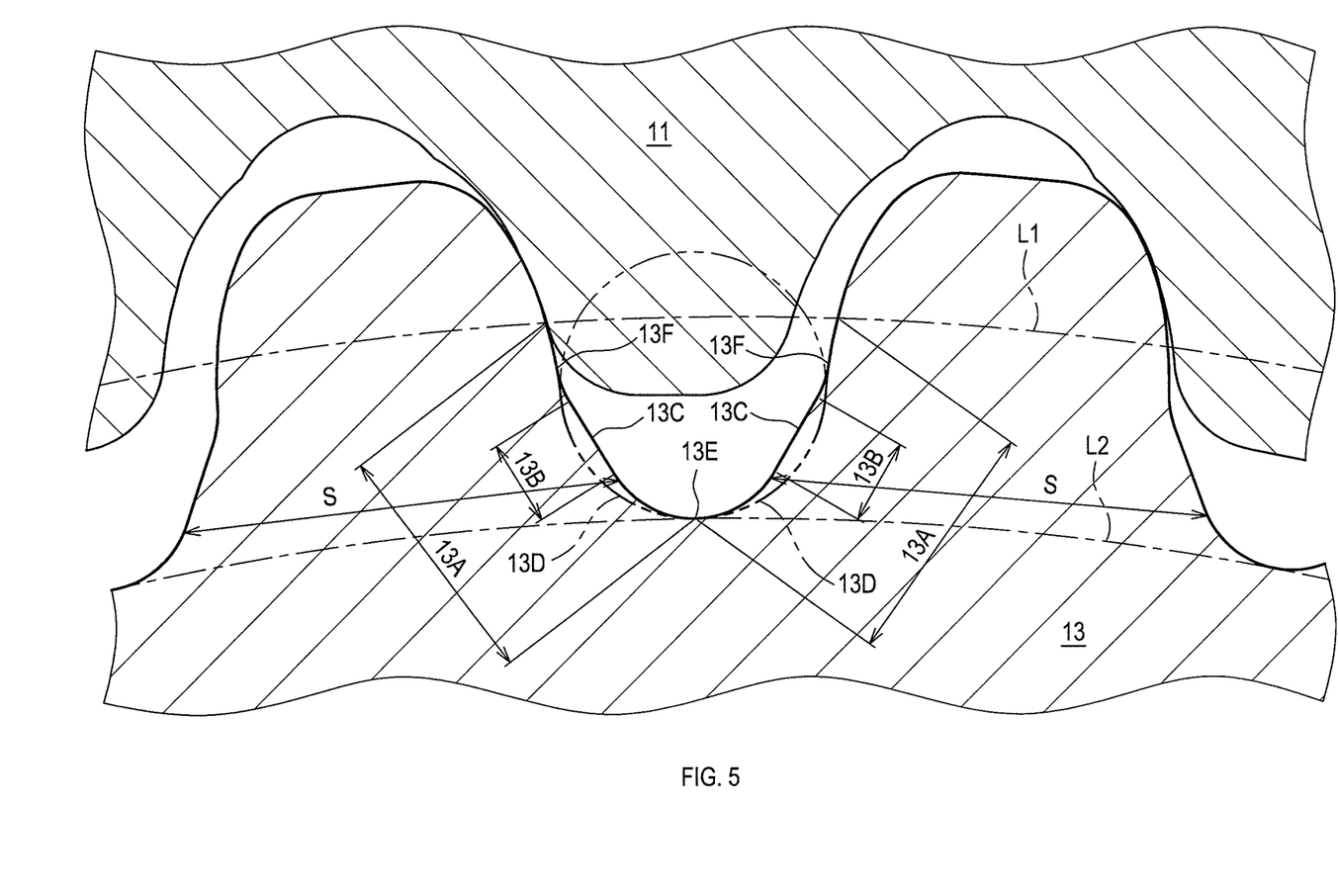
FIG. 5 is an enlarged view showing the external gear according to the embodiment.

As shown in FIG. 5, teeth of the external gear 13 each comprises a dedendum flank 13A comprising a first portion 13B located in the vicinity of a bottom land 13E. The first portion 13B is located toward the top of the tooth relative to a circumference 13D of an osculating circle. That is, the first portion 13B is located in the upper side of the circumference 13D in the up-down direction of FIG. 5. The first portion 13B being located toward the top of the tooth relative to a circumference 13D means that the first portion 13B is located toward the center of the curvature of the circumference 13D relative to the circumference 13D.

The circumference 13D is a circumference of an imaginary circle that overlaps with the surfaces 13B of adjacent teeth of the external gear 13 and contacts the bottom land 13E that extends between the surfaces 13F of the adjacent teeth. The dedendum flank 13A is a portion of the tooth surface 13F from an engaging circle L1 of the external gear 13 to a root circle L2 of the external gear. The engaging circle L1 is involved in the meshing of the external gear 13 with the internal gear 11. The root circle L2 connects the portions of the teeth that are located most adjacent to the bottom lands 13E of the external gear.

The first portion 13B according to the present embodiment comprises a straight portion 13C. The straight portion 13C is located toward the center of the curvature of the circumference 13D relative to the circumference 13D.

The straight portion 13C comprises, as shown in FIG. 4, a critical cross-section SD in the dedendum flank 13A of the tooth of the external gear 13 and is configured such that the thickness S of the straight portion 13C becomes linearly larger toward the root of the tooth (toward the bottom land 13E). In other words, the dedendum flank 13A of each tooth of the external gear 13 comprises a linear portion (the straight portion 13C) in which the thickness S is linearly enlarged toward the root of the tooth. The linear surface of the straight portion 13C intersects with the critical cross-section SD of the tooth of the external gear 13. In still other words, each of the critical cross-sections SD of the teeth of the external gear 13 is included in a portion of the tooth where the thicknesses S of the portion becomes linearly larger toward the root of the tooth.

The critical cross-section SD is defined by Hofer's critical section of tangential angle 30°. Specifically, as shown in FIG. 4, an imaginary line connecting the center point of the top of a tooth and the rotation center of the external gear 13 in a plan view is referred to as a centerline L0 of the shape of the tooth. Moreover, an imaginary line overlapping with the dedendum flank 13A and forming an angle of 30° with the centerline L0 is referred to as a 30-degree tangent line. The critical cross-section SD passes through a contact point of the 30-degree tangent line and the dedendum flank 13A. More specifically, this contact point occurs at the bottom end of the straight portion 13C, as the angle transitions almost instantly from less than 30 degrees (in the straight portion 13C) to more than 30 degrees (below the straight portion).

In the present embodiment, an angle α formed by the centerline L0 and the straight portion 13C is set to be equal to or larger than 20 degrees and smaller than 30 degrees. Specifically, the angle α is preferably approximately 25 degrees.

3. Feature of Recliner (Deceleration Device)

In the present embodiment, the first portion 13B in the dedendum flank 13A of each of the teeth of the external gear 13, which is provided in the vicinity of the bottom land 13E, is located toward the top of the tooth relative to the circumference 13D of the osculating circle.

Due to this configuration, the thickness S of the critical cross-section SD can be enlarged. Accordingly, the deceleration device, that is, the recliner 10 for a vehicle seat comprises an external gear that can withstand large loads.

As shown in FIG. 4, a bending moment (or torque) to be applied to the critical cross-section SD is the product of engagement force F and the length of the moment arm L. The length of the moment arm L is the length of a perpendicular line extending from the intersecting point of the critical cross-section SD and the centerline L0 of the shape of the tooth to the line of action of the engagement force F. The section modulus of the critical cross-section SD is defined to be a value of bending stress that is generated in the critical cross-section SD and bearable to the critical cross-section SD.

The external gear 13 according to the present embodiment is manufactured by plastic working such as press working.

The processing conditions of press working are limited depending on the limitations in the manufacturing of the mold for pressing, the characteristics of the materials to be processed, and so on.

Despite the limitations, since the first portion 13B of each of the teeth is located toward the top of the tooth relative to the circumference 13D of the osculating circle, it is possible to manufacture the external gear 13 with the critical cross-section SD having an enlarged thickness S (tooth thickness at the critical cross-section) while satisfying the aforementioned process conditions.

Moreover, in the present embodiment, the straight portion 13C is provided in the vicinity of the critical cross-section SD in the dedendum flank 13A of each tooth of the external gear 13. The thickness S of the straight portion 13C becomes linearly larger toward the root of each tooth. Accordingly, the external gear 13 having the critical cross-section SD with a large thickness S can be easily manufactured.

[Other Embodiments]

The recliner 10 according to the aforementioned embodiment may be configured, for example, such that the external gear 13 is directly or indirectly secured to the back frame 7 and the internal gear 11 is directly or indirectly secured to the cushion frame 9. In this configuration, the transmission mechanism 21 can be simplified or omitted.

The surfaces of the teeth of the external gear 13 and the internal gear 11 according to the aforementioned embodiment are not necessarily trochoidal surfaces, but may be, for example, cycloidal surfaces, involute surfaces, or the like.

In the recliner 10 according to the aforementioned embodiment, the angle α formed by the straight portion 13C and the centerline Lo of the shape of the tooth may be, for example, equal to or larger than 20° and less than 30°.

Although the first portion 13B is formed by the straight portion 13C in the above-described embodiment, the structure of the first portion 13B is not limited to the structure in the above-described embodiment. The recliner 10 may comprise a first portion that is formed in a curved shape, such as in a circular circumference shape.

The above has described the recliner 10 as an example of the deceleration device. However, the deceleration device may be used for other mechanisms.

Further, the present disclosure is not limited to the above-described embodiments as long as the present disclosure conforms to the gist of the disclosure recited in the claims. Accordingly, a configuration may be employed that is a combination of at least two of the above-described embodiments.

What is claimed is:

1. A deceleration device for a vehicle seat comprising:
an internal gear; and
an external gear that engages the internal gear, the external gear comprising:
a plurality of teeth projecting radially outward,
wherein each tooth of the plurality of teeth comprises a linear surface in a portion of a dedendum flank of each tooth where a thickness of the portion becomes linearly larger toward a root of each tooth, and a critical cross-section located in the dedendum flank, the critical cross-section being a cross-section that intersects the linear surface of each tooth in a direction orthogonal to a radially projecting direction of each tooth.

2. The deceleration device according to claim 1, wherein the external gear is a spur gear.

3. The deceleration device according to claim 1, wherein a distance between the internal gear and the external gear in a revolution direction of the external gear becomes larger from a top of each tooth toward the root of each tooth of the external gear.

4. The deceleration device according to claim 1, wherein the deceleration device is a recliner of a back frame of the vehicle seat, and
wherein the external gear is secured to a cushion frame.

5. A deceleration device for a vehicle seat comprising:
an internal gear; and
an external gear that engages the internal gear, the external gear comprising:
a plurality of teeth projecting radially outward,
wherein adjacent teeth are configured such that an osculating circle is defined therebetween, the osculating circle being defined by an imaginary circle that contacts a bottom land extending between the adjacent teeth and overlaps side surfaces of the adjacent teeth extending from the bottom land, and wherein each of the teeth of the external gear comprises a first portion provided in a vicinity of the bottom land and in a dedendum flank of each of the teeth, the first portion being located toward a top of each of the teeth relative to the osculating circle.

6. The deceleration device according to claim 5 wherein a surface of the external gear that connects the side surfaces of adjacent teeth in the vicinity of the bottom land is a trochoidal surface.

7. The deceleration device according to claim 5, wherein the external gear is a spur gear.

8. The deceleration device according to claim 5, wherein a distance between the internal gear and the external gear in a revolution direction of the external gear becomes larger from the top of each tooth toward a root of each tooth of the external gear.

9. The deceleration device according to claim 5, wherein the deceleration device is a recliner of a back frame of the vehicle seat, and wherein the external gear is secured to a cushion frame.

10. A deceleration device for a vehicle seat comprising:
an internal gear; and
an external gear that engages the internal gear, the external gear comprising:
a plurality of teeth projecting radially outward,
wherein each tooth of the plurality of teeth of the external gear comprises:
a straight portion; and
a critical cross-section located in a dedendum flank of each tooth of the external gear, the critical cross-section being a cross-section that passes through a bottom end of the straight portion of each tooth in a direction orthogonal to a radially projecting direction of each tooth, and wherein a thickness of the straight portion of each tooth becomes linearly larger toward a root of each tooth.

11. The deceleration device according to claim 10, wherein a centerline of a shape of each tooth, that is an imaginary line, connects a center point of a top of each tooth and a rotation center of the external gear, and wherein an angle formed by the straight portion and the centerline of the shape of each tooth is smaller than 30 degrees.

12. The deceleration device according to claim 11, wherein the angle formed by the straight portion and the centerline of the shape of each tooth is in a range between 20 degrees and less than 30 degrees.

13. The deceleration device according to claim 11, wherein the angle formed by the straight portion and the centerline of the shape of each tooth is approximately 25 degrees.

14. The deceleration device according to claim 10 wherein a surface of the external gear connecting adjacent teeth below the critical cross-section is a trochoidal surface.

15. The deceleration device according to claim 10, wherein the external gear is a spur gear.

16. The deceleration device according to claim 10, wherein a distance between the internal gear and the external gear in a revolution direction of the external gear becomes larger from a top of each tooth toward the root of each tooth of the external gear.

17. The deceleration device according to claim 10, wherein the deceleration device is a recliner of a back frame of the vehicle seat, and wherein the external gear is secured to a cushion frame.

* * * * *